Dec. 24, 1946.  J. C. NAEGELE  2,413,065
MEASURING APPARATUS
Filed June 23, 1944  2 Sheets-Sheet 1
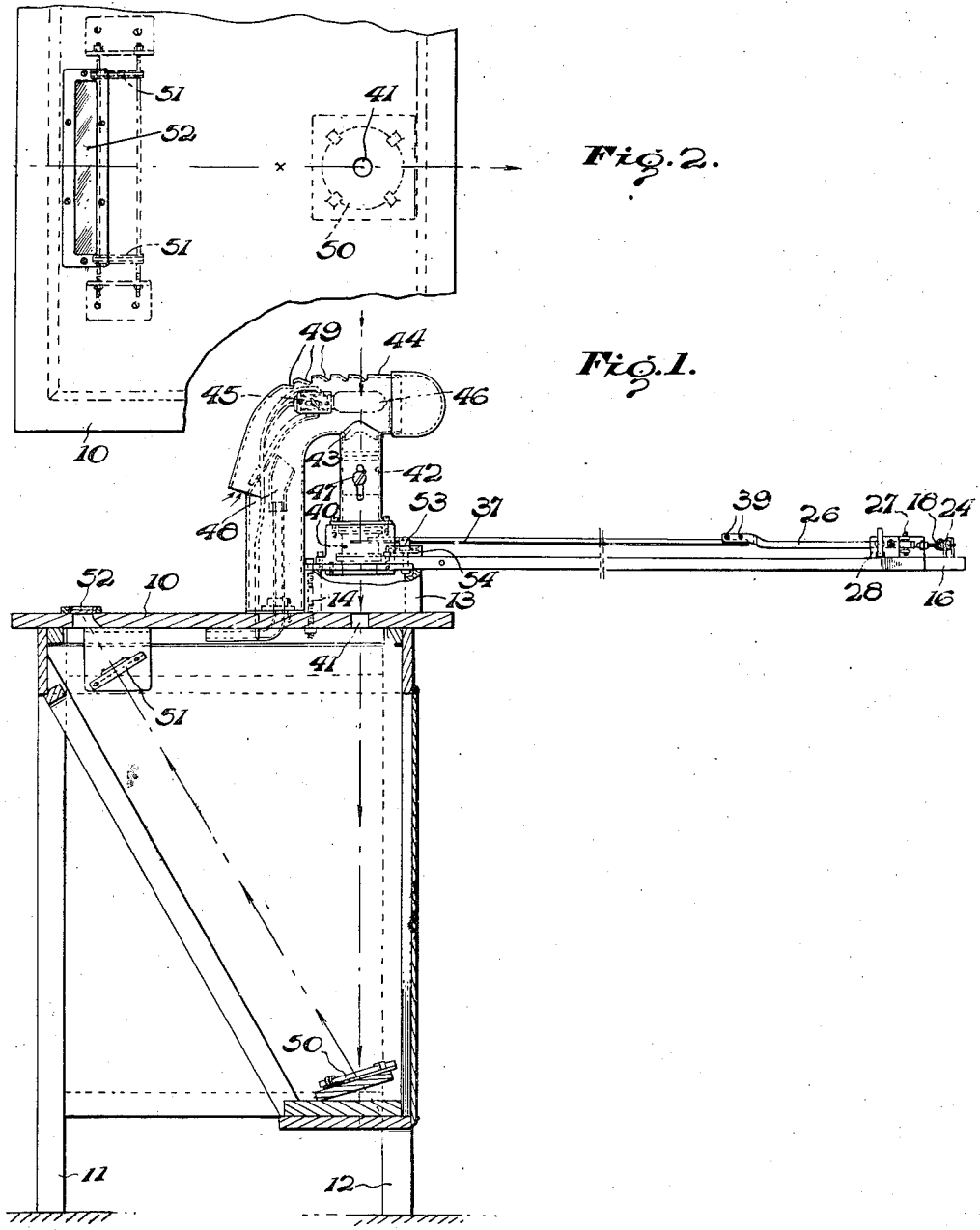
INVENTOR.
John C. Naegele.
BY
ATTORNEY Dec. 24, 1946.　　　　J. C. NAEGELE　　　　2,413,065
MEASURING APPARATUS
Filed June 28, 1944　　　　2 Sheets-Sheet 2
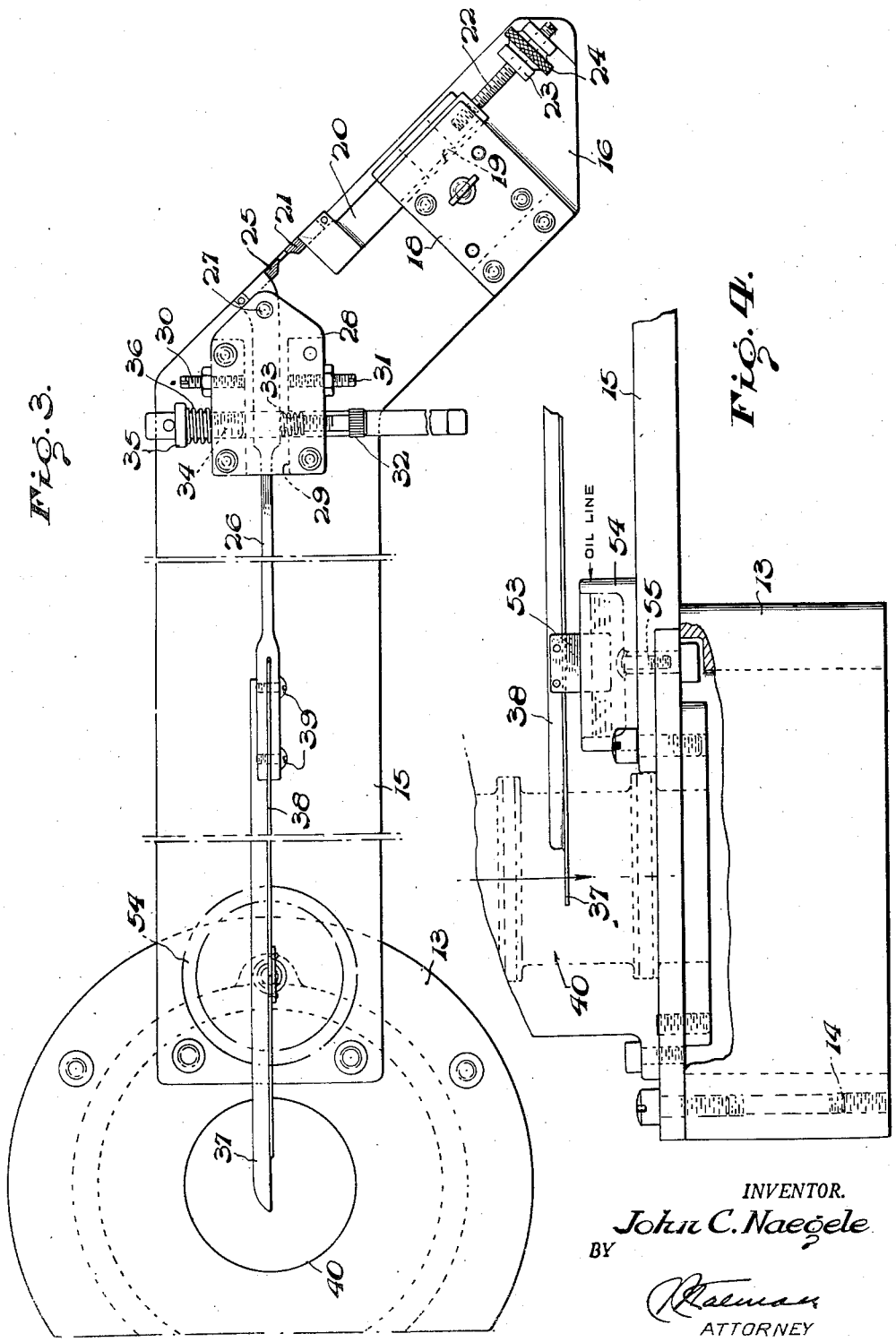
INVENTOR.
John C. Naegele
BY
ATTORNEY Patented Dec. 24, 1946

2,413,065

UNITED STATES PATENT OFFICE 2,413,065

MEASURING APPARATUS

John C. Naegele, Upper Darby, Pa., assignor to
Bendix Aviation Corporation, Teterboro, N. J.,
a corporation of Delaware Application June 28, 1944, Serial No. 542,461

4 Claims. (Cl. 33—148)

This invention relates to measuring instruments generally and more particularly to instruments for measuring objects having small diameters requiring close tolerances.

Instruments heretofore provided for measuring small diameters to close tolerances required skilled personnel for their operation but even with such personnel it was found that a difference in measurements was being obtained by different individuals operating the same equipment. The present invention contemplates the provision of improved and novel equipment for this general purpose with the use of which the above and other disadvantages have been overcome.

An object of the present invention, therefore, is to provide a novel measuring instrument for checking small diameters to close tolerances.

Another object of the invention is to provide a novel measuring device for checking small diameters utilizing mechanical linkages, optical lenses and prisms.

A further object is to provide a novel measuring instrument for checking small diameters, the instrument being such as to eliminate the human element to a point of negligibility whereby relatively unskilled personnel can operate the instrument and readily obtain close measurements thereby.

Another object is to provide novel equipment for measuring small diameters to close tolerances comprising two anvils for engaging the object whose diameter is to be checked, one of the anvils being provided with light adjustable pressure so that the motion of the anvil will be great enough to facilitate the entry of the object without any abrasive action thereon from the anvils.

A further object of the present invention is to provide a novel measuring instrument whereby unskilled personnel are able to easily, rapidly and accurately inspect and segregate small diameter work into groups which vary but five hundred thousandths (.00005") of an inch from each other inasmuch as one ten thousandth of an inch will be indicated by the instrument as equivalent to approximately one inch.

Another object of the present invention is to provide a novel measuring instrument for checking small diameters having a magnification ratio of approximately .0001 to 1.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings, wherein like reference characters refer to like parts throughout the several views;

Figure 1 is a side elevation view, partly in section, of the novel measuring instrument constituting the subject matter of the present invention;

Figure 2 is a top elevation view of a portion of the novel instrument of Figure 1;

Figure 3 is an enlarged top elevation view of the pointer, anvils and other related parts of the instrument of Figure 1; and, Figure 4 is an enlarged fragmentary view of the dampening structure for the indicator of Figure 3.

Referring now to the drawings for a more detailed description of the present invention and more particularly to Figure 1 thereof, the novel measuring instrument is shown as comprising a supporting base including a table top 10 having supporting legs 11 and 12 therefor, a bracket 13 being secured to top 10 by means of bolts 14 and having fastened thereto an outwardly extending arm 15 provided with an angular extension 16 at the outermost end thereof.

Extension 16 of arm 15 has mounted thereon a block 18 having a channel 19 therein for the reception of a transversely movable bar 20 which supports a fixed anvil 21 at one of its ends and is engaged by a threaded bolt 22 at the other of its ends, the bolt being received within a split fixed bearing 23. A knurled wheel 24, mounted for threaded engagement with bolt 22, is arranged within the bearing for rotation in a fixed plane whereby upon rotation of wheel 24, bar 20 is moved in one direction or another carrying anvil 21 therewith.

Mounted for cooperation with anvil 21 is a second anvil 25 which is carried by a lever 26 pivoted for angular motion about a shaft 27 which is journalled in a block 28 suitably fastened to arm 15. Block 28 is formed with a channel 29 for the reception of lever 26 as clearly shown in Figure 3. Adjustable limit stop members 30 and 31 are provided on either side of block 28 whereby they may be inserted into channel 29 to define desired limits for lever motion within the channel.

An adjustable bolt 32 is provided on one side of block 28 and interposed between its inner end and lever 26 is a compression spring 33 whereby a central or zero position may be predetermined for lever 26 by operation of the bolt. The opposite side of block 28 is provided with a bore for the reception of a plunger 34 having an upstanding finger 35 thereon and interposed between the finger and the block is a compression spring 36 so that movement of the plunger against the action of the spring causes it to engage the lever and displace it angularly about shaft 27 whereupon anvil 25 will swing away from anvil 21 to permit the operator to place an object whose diameter is to be checked against anvil 21. When plunger 34 is released spring 36 returns it to a normal position and lever 26 swings to bring anvil 25 into engagement with the object being measured, the amount of lever displacement from a central position when anvil 25 engages the object being a measure of the diameter of the object in a manner to presently appear.

An indicator or pointer 37 is provided having a bent portion 38 arranged at 90° with respect to the pointer, such bent portion being secured within the bifurcated end of lever 26 by means of screws 39. The free end of pointer 37 is mounted for oscillation within a tubular member 40 (Figure 1) the latter being slotted for receiving the pointer. Member 40 is fastened within bracket 13 and cooperates with an opening 41 formed in table top 10 and the other end thereof is telescopically fitted within a tubular sleeve 42 which cooperates with an opening 43 formed within a tubular shield 44 in which is mounted a light socket 45 having a light bulb 46 therein. An adjustment 47 is provided whereby shield 44 and sleeve 42 may be moved up or down relative to pointer 37. If desired, shield 44 may be provided with an air inlet 48 for cooling the inside of the shield, the latter being provided to this end with exhaust openings 49.

Light rays emanating from bulb 46 impinge upon the free end of pointer 37 and cast a shadow thereof through opening 41 in the table to a mirror 50 mounted within the base of the table, such shadow being reflected by the mirror to a lens 51, having an amplification factor of 100, for example, the lens being fastened below table top 10 to pass the image of the pointer shadow onto a screen 52 mounted on table top 10, Figure 2, a suitable scale (not shown) being provided for the screen.

To eliminate substantially all vibration on the part of pointer 37, it is desirable to secure a vane 53 thereto and suspend it for cooperation with a dampening liquid contained in a well 54 fastened to arm 15 by means of a bolt 55.

In operation, the operator stands in front of extension 16 of arm 15 and pushes plunger 34 inwardly against the action of spring 36 whereupon anvil 25 swings away from anvil 21. The object, whose diameter is to be measured is placed against anvil 21 and plunger 34 is released so that spring 33 swings lever 26 about pivot 27 until anvil 25 engages the object. The instrument is so designed that the ratio of the lever length from shaft or pivot 27 to the free end of pointer 37 and the lever length from anvil 25 to shaft 27 is about one hundred to one. Thus, for a very small motion of anvil 25 a relatively large motion is imparted to the end of the pointer. Lens 51 having an amplification factor of 100, further magnifies the amount of motion of the free end of the pointer whose shadow is reflected to the lens by the mirror so that ultimately the magnification factor of the whole apparatus is such that a variation of .0001 of an inch between the anvils will resolve itself into approximately one inch on screen 52.

There has thus been provided a novel and desirable measuring instrument for measuring small diameters to close tolerances and one which may be rapidly and accurately operated by relatively unskilled personnel.

Although but one embodiment of the present invention has been illustrated and described in detail, it is to be expressly understood that the invention is not limited thereto. Various changes may be made in the design and arrangement of the parts without departing from the spirit and scope of the invention as will now be understood by those skilled in the art. For a definition of the limits of the invention reference will be had primarily to the appended claims.

I claim:

1. Measuring apparatus for checking small diameters to close tolerances comprising a support having an extending arm attached thereto, a pair of spaced apertures formed in said support, a pair of anvils between which an object to be measured is insertable, one of said anvils being normally fixed relative to said arm, a pointer pivotally mounted on said arm and having the movable anvil secured to one end thereof and arranged so that the free end of the pointer moves over and relative to one of said apertures and has a relatively large motion for a relatively small motion of the movable anvil, a screen arranged over the other of said apertures for representing pointer motion thereon, means comprising a source of light rays mounted on said support and over the free end of said pointer to cast an image of said pointer through said first aperture, and means comprising a lens in the line of sight of said first aperture for receiving an image of the free end of said pointer and transmitting such image in amplified form onto said screen.

2. Measuring apparatus for checking small diameters to close tolerances comprising a support having an extending arm attached thereto, a pair of spaced apertures formed in said support, a pointer pivotally mounted on said arm, a pair of anvils between which an object to be measured is insertable, one of said anvils being normally fixed relative to said arm, and the other of said anvils being secured for movement to one end of said pointer, the pivotal point of said pointer being closely adjacent said movable anvil whereby for a relatively small motion of said movable anvil the free end of said pointer moves over one of said apertures and has a relatively large motion, means for further amplifying the motion of the free end of said pointer comprising a screen arranged over the other of said apertures for receiving an image of said pointer thereon in amplified form, means supported on said arm for normally resiliently urging said pointer to a central position, and means for urging said pointer from said normally central position.

3. Measuring apparatus for checking small diameters to close tolerances comprising a table having an extending side arm attached thereto, means comprising legs for supporting said table, a pair of spaced apertures formed in said table, a pair of anvils between which an object to be measured is insertable, one of said anvils being normally fixed to said arm, a pointer pivotally mounted on said arm and having the movable anvil secured to one end thereof and arranged so that the free end of the pointer moves over one of said apertures and has a relatively large motion for a relatively small motion of the movable anvil, a viewing screen arranged on said table over the other of said apertures for representing pointer motion thereon, a mirror carried by said supporting means and aligned with said first aperture to receive an image of the pointer and reflect it onto said screen, means carrying a lens arranged between said mirror and said second aperture for amplifying the pointer image on said screen, and means over said pointer for casting light thereon for forming an image of the pointer which is transmitted through said first aperture to said mirror.

4. Measuring apparatus for checking small diameters to close tolerances comprising a table having an extending side arm attached thereto, means comprising legs for supporting said table, a pair of spaced apertures formed in said table, a pair of anvils between which an object to be measured is insertable, one of said anvils being normally fixed to said arm, a pointer pivotally mounted on said arm and having the movable anvil secured to one end thereof and arranged so that the free end of the pointer moves over one of said apertures and has a relatively large motion for a relatively small motion of the movable anvil, a viewing screen arranged on said table over the other of said apertures for representing pointer motion thereon, a mirror carried by said supporting means and aligned with said first aperture to receive an image of the pointer and reflect it onto said screen, means comprising a lens arranged between said mirror and said second aperture for amplifying the pointer image on said screen, means over said pointer for casting light thereon to form an image of the pointer which is transmitted through said first aperture to said mirror, a vane secured to said pointer, and a fluid well mounted on said table for cooperation with said vane to dampen motion of said pointer.

JOHN C. NAEGELE.